United States Patent Office 3,241,167
Patented Mar. 22, 1966

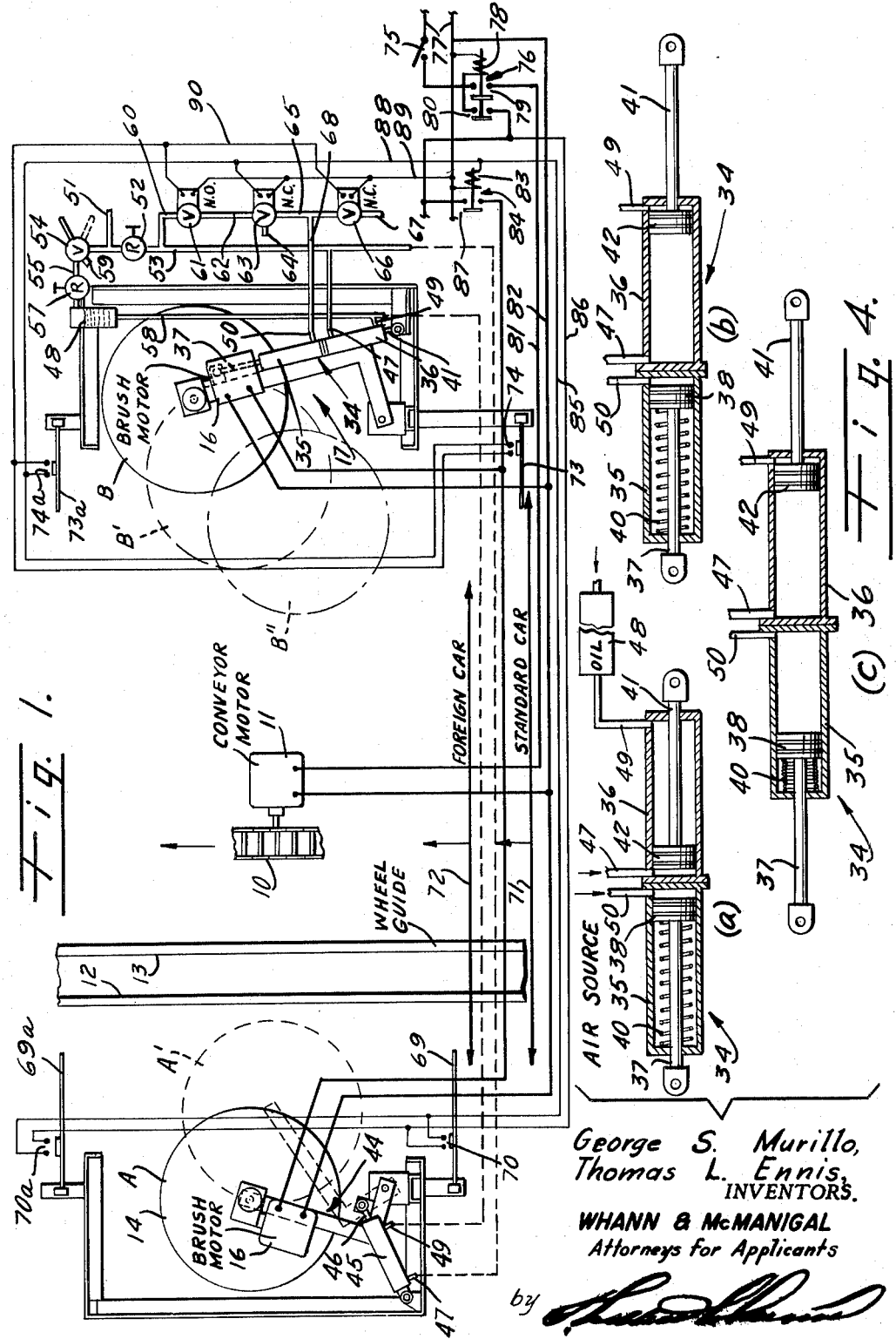

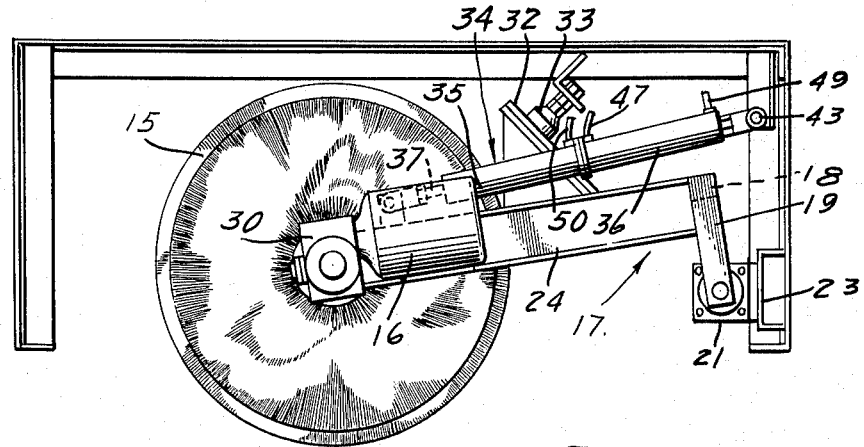
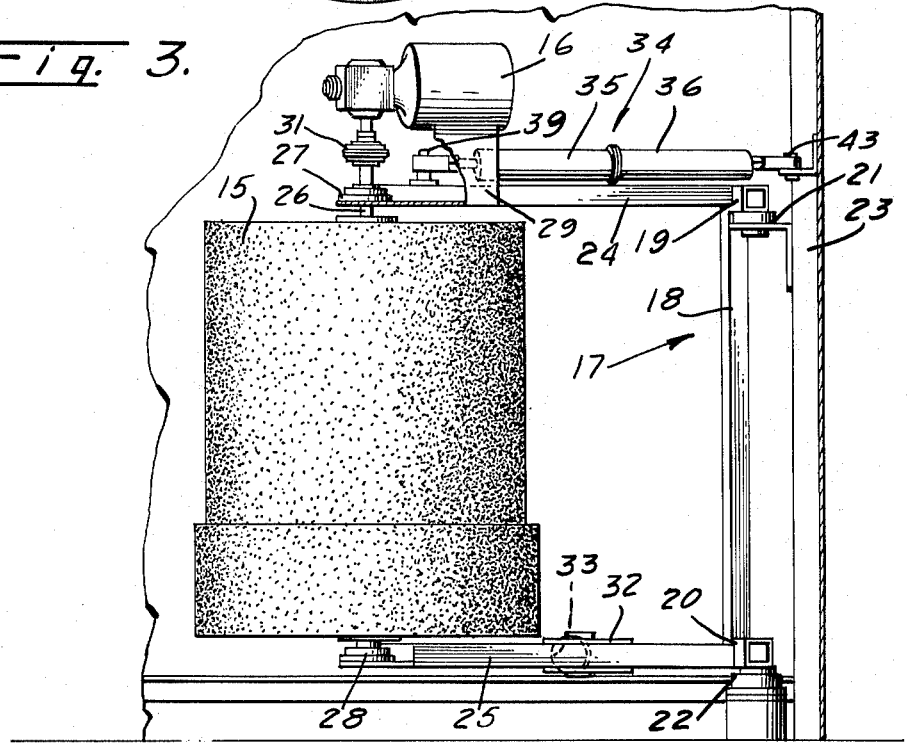

3,241,167
CAR WASHER AND CONTROL FOR CARS
OF DIFFERENT SIZES
George S. Murillo, Monrovia, and Thomas L. Ennis,
Azusa, Calif., assignors to Chem-Therm Mfg. Co., Inc.,
Monrovia, Calif., a corporation of California
Filed Mar. 30, 1964, Ser. No. 355,575
13 Claims. (Cl. 15—21)

The present invention relates generally to apparatus for the washing and cleaning of vehicles, such as automobiles, and is more particularly concerned with improvements in such apparatus which will permit the cleaning instrumentalities to be automatically adjusted depending upon whether the automobile may be of conventional standard size or of compact or foreign smaller sized car or automobile.

Heretofore, apparatus for mechanically washing of automobiles has been arranged to wash cars of a standard size. However, with the recent trend of compact and foreign car designs which are of less width than the conventional standard automobile, the use of conventional washing apparatus for cars of different size has presented a problem.

Having in mind the foregoing, the present invention proposes to provide automobile cleaning apparatus in which the conventional body cleaning brushes are so arranged that they may be moved to a plurality of cleaning positions in accordance with the type of automobile in the cleaning station. That is, if a large standard automobile approaches the cleaning station, the brushes will be arranged a greater distance apart than when a compact or foreign type of small automobile is to be cleaned.

A further object is to provide a unique control for the cleaning elements, which control will be actuated by a vehicle entering the cleaning apparatus, and in which the control will be selective as to whether the vehicle is of wide or narrow width.

A still further object of the invention is to provide a control arrangement which embodies a safety feature in that the jamming of a "large car" in the cleaning elements, which may be in the "small car" cleaning position, will be prevented.

Another object is to provide a control arrangement and brush actuating means such that, if there should be a failure of electrical power or fluid medium for the actuating mechanism, the cleaning elements will automatically be moved to the standard or large car cleaning position.

Still another object is to provide a unique brush shifting fluid actuator which is selectively energizable to position the cleaning brushes in a plurality of positions.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view diagrammatically showing car washer apparatus embodying the features of the present invention, and wherein the details of the fluid and electrical controls have been schematically shown;

FIG. 2 is a plan view of a cleaning element such as utilized in the present invention;

FIG. 3 is an elevational view of the same; and

FIG. 4 is a composite view showing the details of a multi-positioning fluid actuator as utilized for shifting the cleaning element.

Referring more specifically to the drawings, and for illustrative purposes, a cleaning apparatus has been diagrammatically illustrated in FIG. 1 according to the invention.

In conventional cleaning apparatus of this type, the automobiles which are to be cleaned are successively moved along a predetermined path of movement, usually by some type of power mechanism, which for purposes of illustration may comprise a conveyor chain 10 driven by a power source such as a conveyor motor 11. It is also common practice to provide a wheel guide which may comprise a pair of spaced rails 12 and 13 between which the wheels on one side of the automobile will move during transport of the car. Large cleaning rotatable brushes 14 and 15, supported for rotation about a vertical axis are arranged to engage the car sides which will thus be scrubbed during movement of the automobile through the cleaning station. These brushes are individually rotated by means of a suitable power device such as an electric motor 16. In the conventional arrangement, the brushes are usually supported in a suitable manner to permit movement from a fully retracted position to a single extended cleaning position.

It will appear from the foregoing description of the conventional cleaning appratus, that such apparatus wherein the cleaning elements, such as the brushes explained above, which only permit movement to a single cleaning station, are not adapted for installations where it is desired to clean cars of different widths where the brushes must be positionable in a plurality of cooperable cleaning positions. In the present invention, this versatility is accomplished by mounting one of the brushes so that it may be selectively moved to a plurality of cleaning positions, the vehicle being conducted or transported through the cleaning station in such a manner that the other brush will always act in the conventional manner to clean its side of the automobile.

Referring now to FIGS. 2 and 3, the multipositionable brush arrangement will be described in detail.

The brush 15 is supported on a swingable frame structure, as generally indicated at 17, comprising an inner U-frame in which an upright member 18 is welded or otherwise connected at its top and bottom respectively with laterally extending end members 19 and 20. The outer ends of the members 19 and 20 are pivotally supported upon suitable bearing units 21 and 22, these bearings being fixedly mounted upon a stationary elongate channel member 23. Top and bottom arm members 24 and 25 laterally extend from the inner ends of the end members 19 and 20 in right angled relation thereto and thus form in general an L-shaped frame structure which is swingable about the bearings 21 and 22 which form a vertical swing axis.

The outermost ends of the arms 24 and 25 support the brush 15 for rotation about a vertical axis, the brush having an axle 26 which is supported at its upper end in a bearing 27 at the outer end of arm 24, and at its lower end in a bearing 28 at the outer end of the arm 25. The brush driving motor 16 is carried at the outer end of the arm 24 on a supporting bracket 29, the motor having its drive shaft connected through a speed reducer unit 30 and a coupling 31 with the brush axle 26.

Swinging movement of the brush to a fully retracted position is limited by a bracket 32 carried by the arm member 25, this bracket being arranged to engage against an abutment stop 33. Movement in the opposite direction away from fully retracted position is accomplished by providing a multiple positioner actuator, as generally indicated by the numeral 34.

The actuator 34 is comprised of tandem connected cylinders 35 and 36. Cylinder 35 is operatively associated with a reciprocable power delivery member piston rod 37 which carries a piston 38 at its innermost end and is pivotally connected at its outermost end with a pivot stud 39 mounted adjacent the outermost end of the arm 24. The piston is spring loaded by a compression spring 40 which acts to urge the power delivery member towards a retracted position. The cylinder 36 is operatively associated with a power delivery member piston rod 41 which is connected at its innermost end with a piston 42 and at its outermost end is pivotally connected with a pivot stud 43 which is fixedly mounted in offset spaced relation to the swing axis of the frame structure 17.

The brush 14 is supported on a frame structure, as generally indicated by the numeral 44, the frame structure generally being the same as that described for the brush 15. In this arrangement, the actuator moves the frame to only a single cleaning position, the actuator comprising a cylinder 45 with a power delivery piston rod 46.

The details of construction of the actuator 34 and its manner of operation are best shown at FIG. 4. The fully retracted position of the actuator is shown in FIG. 4 (a). If it is now desired to extend the actuator to an intermediate position as shown in FIG. 4 (b), fluid pressure is applied to fluid connection 47 which will move the piston 42 to the opposite end of the cylinder and extend the piston rod 41. During this movement, the piston 42 moves against a liquid on the opposite side of the piston, in this case a light lubricating oil which is supplied from a reservoir 48 to a connection 49 at the opposite end of the cylinder.

In order to energize the actuator 34 so as to move to its fully extended position, the cylinder 35 is supplied with fluid pressure through a connection 50 which will act against the piston 38 and force it to the other end of the cylinder 35 against the opposing force of spring 40, as shown in FIG. 4 (c).

When it is desired to return the actuator 34 to its intermediate position, it is only necessary to disconnect the fluid pressure with respect to the connection 50, whereupon the spring 40 will retract the piston rod 37. In order to then return the actuator to its fully retracted position, the supply of fluid is disconnected with respect to connection 47, whereupon the pressure of oil or other fluid acting on the opposite side of the piston 42 will urge the piston rod 41 to its retracted position. From the foregoing, it will be apparent that the operation of the two fluid power units constituting the actuator 34 may be independently and selectively energized and deenergized to control the position of the brush 15.

Referring to FIG. 1, control of the fluid actuators for the brushes 14 and 15 is accomplished through a fluid valving arrangement which will now be described. A source of pressurized air is connected by a conduit 51 with a pressure adjustable regulator 52 by means of which the air pressure from the source may be adjusted to approximately 20 p.s.i. and delivered directly by an outlet conduit 53 to the connections 47 of the cylinders 36 and 45 respectively.

The conduit 51 also connects with a manually controlled three-way valve 54 which is arranged in its opened position to connect the air supply source with an outlet connection 55 leading to a pressure adjusting regulator 57 by means of which the pressure of air may be regulated to approximately 60 p.s.i. and delivered directly to the top of the container or reservoir 48 wherein it pressurizes the liquid therein. The pressurized liquid, such as oil, is delivered through a conduit 58 to the connections 49 of the cylinders 36 and 45 respectively. When the valve 54 is moved to its closed position, the supply of pressurized air to the outlet connection 55 is disconnected, and the inlet of the regulator 57 connected to an exhaust outlet 59 which relieves the air pressure acting on the liquid oil in the reservoir 48.

The liquid oil serves as a lubricant for the pistons in the cylinders 36 and 45, and also provides a counteracting pressure which overrides the normally applied pressure and causes a retraction of the piston rod 41. However, when the counteracting liquid oil pressure is relieved, the normal acting pressure causes an extension of the piston rods 41 and 46. In this manner, the brushes are moved from a fully retracted position to a cleaning position for engagement with the body of a car being washed.

Control of the actuator unit having the cylinder 35 and power delivery piston rod 37 is accomplished by means of an arrangement of solenoid remotely controlled valves which are connected as shown in FIG. 1. As there shown, the outlet side of the regulator 52 is connected through a branch conduit 60 to the inlet side of a two-way, normally open valve 61. The outlet of this valve connects through a conduit 62 with the inlet of a three-way, normally closed valve 63. This valve, in closed position connects its outlet with an exhaust connection 64, the outlet being connected through a conduit 65 with the inlet of a two-way normally closed, valve 66 having an outlet connection 67 with the atmosphere. The conduit 65 connects through a branch conduit 68 with the connection 50 of cylinder 35.

The valves 61, 63 and 66 are solenoid actuated, and while arranged to be remotely controlled by contacts operable in response to movement of a car to the washing station, it is within the broad concept of the invention to utilize fluid controlled valves which might be controlled in their operation by remotely controlled treadle valves or the like in the path of movement of the vehicle.

In the valve arrangement shown, it will appear that with the air source connected, regulated air pressure from the regulator 52 will normally pass through the open valve 61 to closed valve 63. However, if valve 63 is opened, air pressure will be supplied to the cylinder 35 and extend its piston rod 37 against the pressure of spring 40. However, if valve 63 is again closed, the supply of air to the cylinder 35 will be discontinued, and since the valve 63 in its closed position connects its outlet to the exhaust connection 64, the spring 40 may act to retract the power delivery piston rod 37. Thus, through the use of a single air connection it is possible to extend and retract the piston rod 37 and change the position of the brush 15 from one cleaning position to another. The valves 61 and 66 provide overriding control which will be operative to retract the piston rod 37, when the valve 63 is in open position and normally supplying air pressure to the connection 50 of the cylinder 35. Under such conditions, if the valve 61 and valve 66 are actuated from their normal position, the valve 61 will be closed and terminate the supply of air pressure, and upon energization the valve 66 will be opened and connect conduit 65 so that it may exhaust to atmosphere through outlet connection 67. This permits the spring 40 to retract the piston 37.

Automatic control and shifting of the brushes 14 and 15 to cleaning position selective with respect to standard cars and compact or foreign cars is accomplished by means of an arrangement of limit switches of the wand type which will be actuated by engagement by the automobile in its movement to the cleaning station. More specifically, a limit switch having a wand actuator 69 is arranged at the entrance to the cleaning station, this switch having normally open contacts 70. A similar switch 69a and having normally open contacts 70a which are connected in parallel relation with the contacts 70, is arranged at the exit of the cleaning station. These two switches are arranged on the left side of the wheel guide and in a position such that either a standard car or a foreign car, having widths as represented by the double-arrow lines 71 and 72 respectively, will successively engage the wands of these switches and operate them during approach to, while in and upon leaving the cleaning station.

A similar set of switches are arranged on the right side of the wheel guide, the switch at the entrance to the cleaning station having a wand actuator 73 and normally open contacts 74, while the switch at the exit of the cleaning station on this side has a wand 73a and normally open contacts 74a. The contacts 74a and 74 are likewise connected in parallel relation. It will be observed however that the wands 73 and 73a are arranged laterally in such positions that they will be missed by the body of a foreign or compact car, but will be engaged by the body of a standard car as it approaches and passes through the cleaning station. Also, it will be observed that in the case of the entering standard car, the wand 73 of the switch on the right side will be engaged prior to the engagement of the wand 69 on the left side. Thus, the switches at the entrance of the cleaning station will be sequentially and selectively actuated. At the exit, the wands 69a and 73a are similarly positioned with respect to the direction of travel of the vehicle.

The operation of the present invention will now be briefly described, having reference to FIG. 1.

*Standard car operation*

Before starting up the apparatus, the brushes 14 and 15 will be in fully retracted position as indicated in full lines at A and B respectively. With the valve 54 in closed position the application of air pressure to conduit 51 will energize cylinders 36 and 45 through their connections 47 so as to extend their piston rods and as a result will move the brush 14 to the position indicated at A', and the brush 15 to the position indicated at B'. This is the normal position of the brushes, and is the position which would normally be assumed by the brushes for cleaning a standard car or vehicle. In describing the further operation of the equipment, the control of water and other ancillary parts of the apparatus will not be described, since they are immaterial to the present invention. Either a standard car or a foreign car may at this time be admitted to the cleaning station. Assuming that a standard car approaches the station, the conveyor motor will first be started, if the conveyor mechanism is not already operating. This motor is started by closure of a line switch 75 to connect a conveyor motor starter 76 with the electrical source 77. The conveyor motor starter has an actuating winding 78 which is energized upon closure of the switch 75. Actuation of the starter switch closes contacts 79 and 80 respectively. Closure of the contacts 79 connects one side of the electrical source through a conductor 81 with one terminal of the motor, a conductor 82 connecting the other motor terminal with the other side of the electrical source. Thus, upon the actuation of starter 76, the conveyor motor will begin operating.

Assuming now that a standard car approaches the cleaning station, the body of the car will first engage the wand 73 and cause it to close its contacts. These contacts or the contacts 74a will remain closed until the car leaves the cleaning station. Now, as the car further moves to enter the cleaning station, the wand 69 will be engaged and close contacts 70 which will now establish a circuit to energize an actuating winding 83 of a starter 84 for the brush motors 16—16. The winding 83 will be energized through a circuit as follows: from one side of the electrical source, through the winding 83, conductor 85, through contacts 70, conductor 86, through contacts 80, and thence back to the other side of the electrical source. Starter 84 now closes its contacts 87 to complete an energizing circuit to the motors 16—16, whereupon the brushes start rotating.

Simultaneously with the starting of the brush motors, a circuit is established with the solenoid of valve 63 from one energized terminal of winding 83 through a conductor 88, through the solenoid of valve 63, and thence back through a conductor 89 to the other side of the electrical source. The valve 63 will operate to connect its inlet side with conduit 62 which is cut off by the valve 61 at this time from the air source by virtue of the circuit established by the closure of contacts 74. Contacts 74 and 70 being closed at the same time, a circuit is established which will operate both valves 61 and 66, as follows: from one energized terminal of winding 83, through conductor 88, contacts 74 conductor 90 and respectively through the solenoids of valves 61 and 66 back to conductor 89 which connects with the other side of the electrical source. Thus, the operation of the valve 63 is ineffectual, and the piston rod 37 remains retracted. The standard car thus proceeds through the cleaning station and upon emerging, the contacts 70a and 74a will open and reestablish the control for the next car following.

*Foreign or compact car operation*

Assuming now that a foreign or compact car enters the cleaning station, it will be observed that the width of these cars is such that the entering car will not engage the wand 73 on the right side, and that the wand 69 will now be the first one to be engaged, and that engagement of this switch will close the contacts 70 so as to energize the winding 83, close the contacts 87 of the starter 84, and thus start the brush motors in the same manner as previously explained. Simultaneously, the energizing circuit will be established to the solenoid of valve 63 through the circuit previously explained. This valve will now open and, since valve 61 is now open, will feed air pressure to the connection 50 of the cylinder 35 which will now operate to extend the piston rod 37 and swing the brush 15 from its B' position to the position B'' which is the position for cleaning foreign cars or small cars. Before the car in the cleaning station releases the wand 69, it will have engaged the wand 69a, so as to keep the circuits established sufficiently long to permit a full cleaning operation to be accomplished. Upon release of the wand 69a, the control will be reestablished for the next car.

Should a standard car enter the cleaning station prior to the emergence of a foreign car, jamming against the brushes in extended position is prevented by virtue of the standard car engaging the wand 73 which will now close contacts 74 and complete the previously explained energizing circuit to valve 61 and 66 which will operate. The valve 61 now cuts off the air supply, while valve 66 connects the cylinder 35 to atmosphere and permits the spring 40 to retract the brush 15 back to the cleaning position B', where it may receive without damage the standard car. This constitutes a very desirable safety factor.

With the control arrangement as described above, the spring 40 will always operate to place the brushes in large car cleaning positions upon the failure of electrical power or air source.

Various modifications may suggest themselves to those skilled in the art without departing from the spirit of our invention, and hence, we do not wish to be restricted to the specific forms shown or uses mentioned, except to the extent indicated in the appended claims.

We claim:
1. A car washer, comprising:
 (a) means for guiding a car to be washed along a predetermined path of movement, said path including a washing station;
 (b) body washing elements supported for movement into washing positions of engagement with the car body in said washing station; and
 (c) actuating means responsive to car movement along said path for variably presetting the relative washing positions of said elements in accordance with the size of the car.
2. A car washer, comprising:
 (a) means for guiding a car to be washed along a predetermined path of movement, said path including a washing station;
 (b) washing elements supported for relative movements to a cleaning position in engagement with the body of said car;

(c) actuating means operable to move said washing elements towards and away from said car body; and (d) means responsive to car movement along said path for modifying the operation of said actuating means so as to control the extent of said movement towards said car body and preset the cleaning position of the washing elements depending upon the size of the car.

3. A car washer, comprising:
 (a) means for guiding a car to be washed along a predetermined path of movement, said path including a washing station;
 (b) a power driven washing element;
 (c) means supporting said washing element for swinging translatory movement to a cleaning position for engagement with the body of said car; and
 (d) actuating means for controlling the extent of said translatory movement and variably presetting the cleaning position of said washing element in accordance with a sensed car size.

4. A car washer, comprising:
 (a) means for guiding a car to be washed along a predetermined path of movement, said path including a washing station;
 (b) a power driven washing element;
 (c) swingable supporting means for said washing element; and
 (d) actuating means operable to move said supporting means to variably position said washing element in predetermined cleaning positions for engagement with the car body, said actuating means being controlled in response to the size of the car to be washed.

5. Vehicle washing apparatus, comprising:
 (a) means for successively guiding vehicles of relatively wide and narrow widths along a predetermined path of movement, said path including a washing station;
 (b) a vehicle body washing element positioned on one side of said path of movement having a substantially similar washing position of engagement with the adjacent body side of each of said vehicles in said washing station;
 (c) a cooperable vehicle body washing element positioned on the other side of said path of movement engageable with the other side of the body of each vehicle in said washing station; and
 (d) means controlled by each vehicle in the washing station for varying the washing position of the washing element on said other side in accordance with the width of the vehicle.

6. Vehicle washing apparatus, comprising:
 (a) means for guiding vehicles to be washed along a predetermined path of movement, said path including a washing station;
 (b) a vehicle body washing element positioned on one side of said path of movement and supported for bodily movement to a washing position of engagement with a side of the vehicle body in said washing station;
 (c) fluid power means operable to bodily move said supported element with respect to said vehicle body; and
 (d) means controlling said power means so as to move said element to one washing position for a vehicle of one width and to another washing position for a vehicle of another width.

7. Vehicle washing apparatus, comprising:
 (a) means for guiding vehicles to be washed along a predetermined path of movement, said path including a washing station;
 (b) a vehicle body washing element positioned on one side of said path of movement and supported for bodily movement to a washing position of engagement with a side of the vehicle body in said washing station;
 (c) fluid power means for moving said supported element with respect to said vehicle body, including tandem connected cylinder and piston units, the piston of one of said units being spring loaded in a direction opposing its actuation by fluid energization;
 (d) means for energizing one of said units to move said supported element to a washing position for a vehicle of one width; and
 (e) means for energizing the other of said units to further move said supported element to a washing position for a vehicle of different width.

8. Vehicle washing apparatus, comprising:
 (a) means for guiding a vehicle to be washed along a predetermined path of movement, said path including a washing station;
 (b) a rotatable vehicle body washing element carried by a frame positioned on one side of said path of movement, said frame being supported for moving the element into a washing position of engagement with the vehicle body in said washing station;
 (c) fluid actuator means selectively operable to move said frame and element to a plurality of washing positions;
 (d) electromagnetic fluid control means operable to energize said fluid actuator for movement of said element to one of said washing positions, said electromagnetic means having an electrical energizing circuit; and
 (e) switch means on the other side of said path of movement having contacts for controlling the electromagnetic means energizing circuit, said contacts being operable in response to movement of vehicle into the washing station.

9. Vehicle washing apparatus, comprising:
 (a) means for guiding a vehicle to be washed along a predetermined path of movement, said path including a washing station;
 (b) a rotatable vehicle body washing element carried by a frame positioned on one side of said path of movement, said frame being supported for moving the element into a washing position of engagement with the vehicle body in said washing station;
 (c) fluid actuator means selectively operable to move said frame and element to a plurality of washing positions; and
 (d) position selector control means for said actuator including selectively energizable control circuits, one said circuits being controlled by vehicle actuated contacts on one side of said path of movement and another of said circuits being controlled by vehicle actuated contacts on the other side of said path of movement.

10. Vehicle washing apparatus according to claim 9, wherein the contacts on one side of said path are positioned so as to be actuable by vehicles irrespective of vehicle width, while the contacts on the other side of said path are actuable by vehicles of a width exceeding a predetermined value.

11. Vehicle washing apparatus according to claim 9, wherein the contacts on one side of said path are positioned so as to be actuated by the moving vehicle prior to the actuation of the contacts on the other side of said path of movement.

12. In vehicle washing apparatus:
 (a) a frame supported for swinging movement about a vertical axis;
 (b) a rotatable brush supported on said frame for rotation about a vertical axis outwardly spaced from said frame axis;
 (c) fluid power means for swinging said frame about its axis, said means including a pair of tandem connected units each of which has a cylinder and a reciprocable power delivery actuator connected to a piston; and (d) means pivotally connecting said power means between said frame and a fixed support; whereby said units may be energized to move the frame from a brush inactive position to one or the other of two active cleaning positions.

13. In vehicle washing apparatus:
(a) a frame supported for swinging movement about a vertical axis;
(b) a rotatable brush supported on said frame for rotation about a vertical axis outwardly spaced from said frame axis;
(c) fluid power means for swinging said frame about its axis, said means including a pair of tandem connected units each of which has a cylinder and a reciprocable power delivery actuator connected to a piston;
(d) means pivotally connecting said power means between said frame and a fixed support;
(e) means for supplying an energizing fluid pressure to both of said units to extend the respective power actuators and position the brush in one cleaning position; and
(f) spring means normally urging one of said actuators towards a retracted position; whereby upon disconnection of the supply of fluid pressure acting thereon, said one of said actuators will be retracted and position the brush in another cleaning position.

References Cited by the Examiner
UNITED STATES PATENTS

| | | | |
|---|---|---|---|
| 2,242,692 | 5/1941 | Yingling | 15—53 |
| 2,705,810 | 4/1955 | McDermott | 15—21 |
| 3,037,223 | 6/1962 | Lovsey | 15—21 |

CHARLES A. WILLMUTH, *Primary Examiner.*